Aug. 11, 1942.   G. K. STEWARD   2,292,409
INTERNAL COMBUSTION ENGINE
Filed May 11, 1939   2 Sheets-Sheet 1
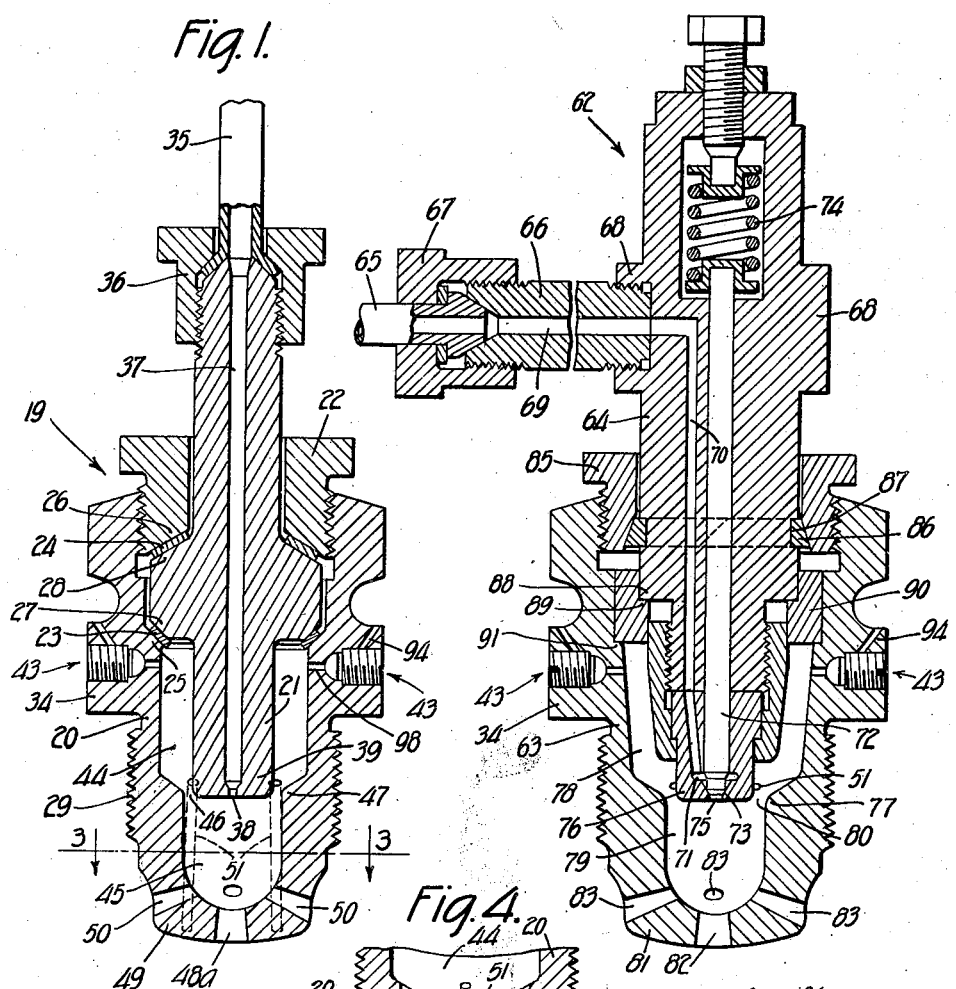
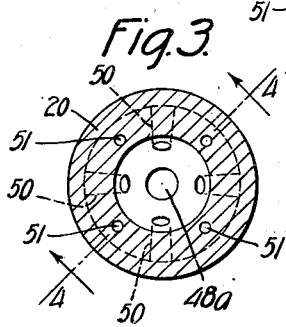
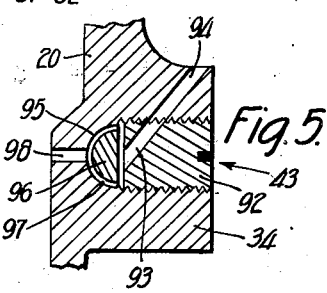
INVENTOR
George K. Steward
BY
ATTORNEY Aug. 11, 1942.   G. K. STEWARD   2,292,409
INTERNAL COMBUSTION ENGINE
Filed May 11, 1939   2 Sheets-Sheet 2
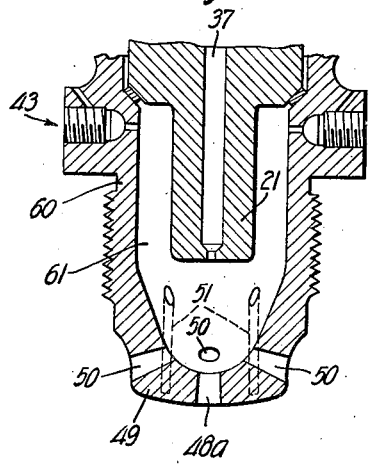
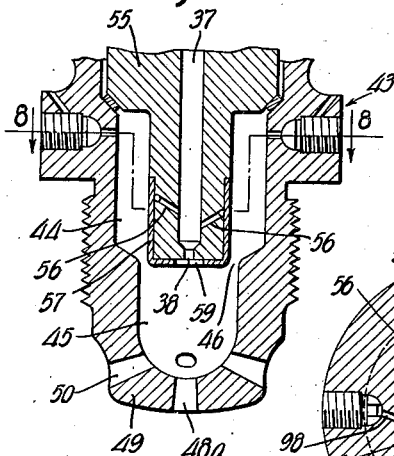
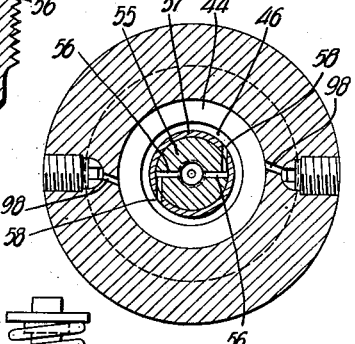
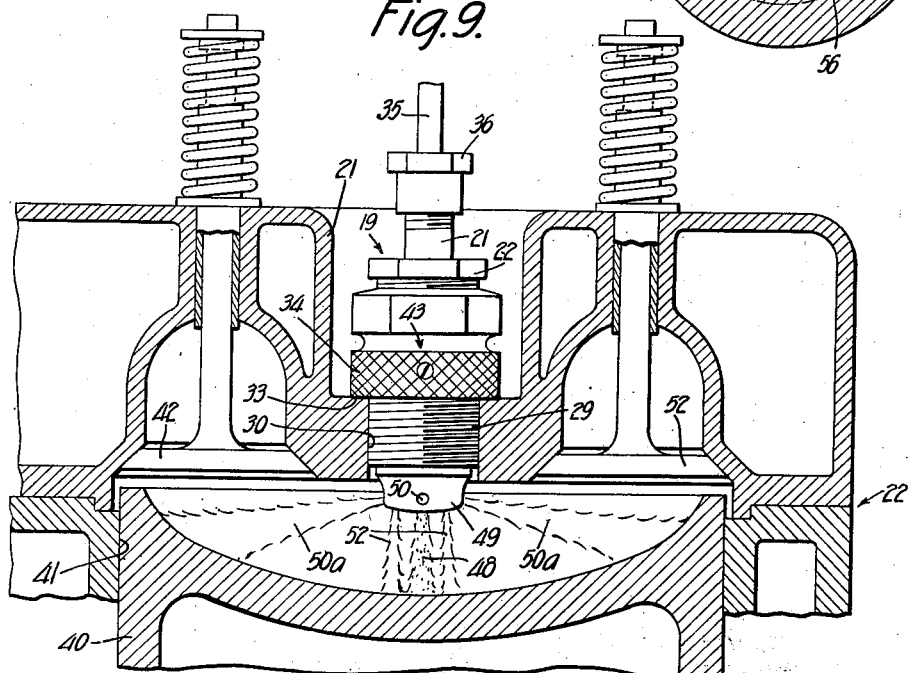
INVENTOR
George K. Steward
BY
John Waldheim
ATTORNEY Patented Aug. 11, 1942

2,292,409

UNITED STATES PATENT OFFICE 2,292,409

INTERNAL COMBUSTION ENGINE

George K. Steward, Denville, N. J.

Application May 11, 1939, Serial No. 272,982

2 Claims. (Cl. 123—32)

This invention relates to improvements in internal combustion engines and more particularly to the kind in which heavy oil is used as fuel and in which ignition is effected by injecting the fuel into compressed air, the Diesel engine being one well known type of this kind of engine.

An object of the invention is to provide means and a method of firing the combustion charge of an internal combustion engine to more completely and more rapidly consume the power charge by intensifying the turbulence of the fired power charge.

Heretofore turbulence of the power charge has been aided by means of a pre-combustion chamber which is connected through a restricted port through which air is forced from the cylinder into the pre-combustion chamber, and through which ignited gas issues from the pre-combustion chamber into the cylinder. In such a construction it is impossible to expel all of the exhaust gas from the pre-combustion chamber and therefore there always remains in the pre-combustion chamber a quantity of exhaust gas which mixes with the fresh charge.

In carrying out the present invention provision is made to admit air into the pre-combustion or ignition chamber, by means independent of the port communicating with the cylinder, and thereby purge the pre-combustion chamber of all the exhaust gas so that a mixture may be prepared in said chamber which is unpolluted. To this end, in the present form of the invention, an air inlet check valve is provided to admit air into the pre-combustion chamber during the intake stroke of the piston thereby expelling all the exhaust gas with a result that there may subsequently be prepared a mixture which is free of impurities such as exhaust gas or in other words products of combustion.

In a more efficient form of the invention two ignition chambers, similar to those shown in my Patent No. 2,153,598, granted April 11, 1939, are associated with the fuel injection nozzle and in which chambers separate firing charges are prepared to create, when ignited, a cumulative expulsion effect and thereby intensify the turbulence of the burning power charge.

Other features and advantages will hereinafter appear.

In the drawings which form part of the specification:

Fig. 1 is a vertical section through an ignition device including an injection nozzle;

Fig. 2 is a view similar to Fig. 1 showing a different type of nozzle;

Fig. 3 is a horizontal section taken on the line 3—3 of Fig. 1;

Fig. 4 is a vertical section taken on the line 4—4 of Fig. 3;

Fig. 5 is a vertical section, on a larger scale, through one of the check valves shown in Fig. 1;

Fig. 6 is a vertical section of a portion of a unit showing a single ignition chamber;

Fig. 7 is a view, in section, showing a portion of the unit illustrated in Fig. 1 with a nozzle having a plurality of fuel delivery orifices;

Fig. 8 is a horizontal section taken on the lines 8—8 of Fig. 7; and

Fig. 9 is a vertical section through the head portion of a cylinder and a piston of an internal combustion engine.

Similar reference characters represent similar parts throughout the several views.

The ignition device 19, Fig. 1, includes a casing or shell 20 in which there is held a fuel injection nozzle 21 by a sleeve nut 22 threaded into the upper end of the shell 20, gaskets 23 and 24 being interposed between shoulders 25 and 26 of the shell and nut respectively, and cooperative shoulders 27 and 28 of the nozzle.

A threaded portion 29, of the shell 20, screws into a threaded hole 30, Fig. 9, in the water jacket 31, of the motor casing 32, until it is tightly seated against a shoulder 33 formed on an annular portion 34 of the shell 20.

An oil fuel inlet pipe 35, Fig. 1, extends from the usual fuel pump, not shown, and is connected to one end of the nozzle 21, by a sleeve nut 36. The liquid fuel is forced through a passage 37 and is sprayed out through a constricted orifice 38 in the nose 39 of the nozzle 21.

The invention is herein shown as applied to a four-stroke cycle, solid injection Diesel engine which operates in the following manner. Upon the down stroke of a piston 40, in a cylinder 41, an intake valve 42 is opened in the usual well known manner, and a fresh quantity of air is drawn into the cylinder 41 or combustion chamber. The present invention provides a check valve 43, in the casing 20 of the ignition device, through which is drawn, during the intake stroke of the piston, a supply of fresh air, from the atmosphere, into auxiliary chambers 44 and 45 of the device 19. The air taken in through the valve 43 scavenges the chambers 44 and 45 entirely of the products of combustion. Consequently an uncontaminated mixture of air and fuel oil may be formed therein. The chambers 44 and 45 communicate with one another through a narrow annular passage 46 formed by the nose 39 of the nozzle and annular shoulder 47 formed on the shell 20. The auxiliary chambers 44 and 45 are located with respect to the combustion chamber 41 so that the chamber 44 is remote from the combustion chamber 45 occupies an intermediate position.

During the succeeding up stroke of the piston the air in the cylinder 41 and the chambers 44 and 45 is compressed and, while the piston is substantially at the end of this stroke, fuel oil is injected into the compressed air through the orifice 38 of the nozzle. The fuel passes chiefly, in the form of a jet 48, Fig. 9, through a central port 48a in a nose 49 of the casing 20, into the combustion chamber 41 to prepare the power charge.

As the fuel issues from the orifice 38 a portion of the jet of fuel is atomized in the chamber 45, some of the atomized particles strike the hot walls of the chamber 45 and are gasified. This gasified fuel finds its way into the chamber 44 through the annular passage 46 and mixes with the pure or unpolluted air therein. Thus three separate mixtures are provided, one forming the power charge in the cylinder 41 and two forming the ignition charges in the chambers 44 and 45, the mixture in the auxiliary chamber 44 being leaner than that in the chamber 45, and the mixture in the auxiliary chamber 45 being leaner than that in the cylinder 41.

Upon ignition of the charges, which is effected by the heat of the compressed air, the burning expanding gas issues from the auxiliary chamber 45 through angularly disposed or divergent ports 50, in the nose 49, and into the combustion chamber or upper part of the cylinder 41, in the form of flaming torches 50a. The speed of travel of these flaming torches, initiated by the charge in the chamber 45 is greatly enhanced by the expanding, burning gas of the chamber 44 thus producing a cumulative expulsion of the fire from the nose 49 to enhance the ignition effect of the combined firing or auxiliary charges on the power charge in the cylinder 41. This cumulative expulsion of the fire also intensifies the turbulence in the cylinder to thereby effect thorough mixing of the fuel with the air to further facilitate rapid and complete consumption of the power charge.

Canals 51, see particularly Figs. 3 and 4, extend from the auxiliary chamber 44 to the combustion chamber through which some of the fuel may pass from the cylinder 41 into the chamber 44 and through which the expanding burning gas may pass from the chamber 44 to the cylinder, the burning gas issuing from said canals in the form of torches 52 to assist in expediting the burning of the power charge.

Thus it will be understood that instead of a gradual or comparatively slow burning of the power charge, which is characeristic of oil burning engines, there is created by the method and means of this invention a rapid or substantially instantaneous combustion of the power charge which is substantially like the combustion of the power charge in a gasoline engine.

As the ignited gas expands in the cylinder 41 the piston 40 is moved downwardly thereby to perform its power stroke. During the subsequent up stroke of the piston an exhaust valve 52 is opened, in the usual manner by means not shown, so that the exhaust gas may be forced therethrough by the piston. As soon as the piston descends again the exhaust valve 52 is automatically closed and the inlet valve 42 is again automatically opened to admit a charge of fresh air into the cylinder. At the same time air is drawn in through the check valve 43 into the chambers 44 and 45 as previously described to purge them of the exhaust gas so that pure mixtures may be subsequently formed therein.

In Fig. 7 there is shown a modified form of nozzle 55, which may be used instead of the nozzle 21. It is provided with one or more ducts 56, extending from the central fuel passage 37, through which fuel may be injected directly into the auxiliary chamber 44. These ducts are disposed, see Fig. 8, to direct jets of fuel substantially tangent to the wall of the chamber 44 to effect a whirl and thus effect thorough mixing of the fuel with the air in said chamber. To facilitate making of the ducts 56 the end of the nozzle 55 is provided with a cap 57 in which the orifice 58 of each duct is formed. The cap is also provided with a hole 59 through which the main jet of fuel passes from the orifice 38.

In a simpler and somewhat less efficient form of the invention, shown in Fig. 6, the casing 60 is provided with only a single auxiliary chamber 61 into which the nozzle 21 extends, otherwise the structure is similar to that shown in Fig. 1, and the corresponding parts having the same reference characters applied thereto, said chamber having associated therewith one or more check valves.

In Fig. 2 there is illustrated a different form of device 62 having a casing 63 to accommodate a normally closed type of nozzle 64. In this type of nozzle fuel is conducted through an inlet pipe 65 and a pipe 66 in which the pipe 65 is suitably connected by means of a coupling 67. The pipe 66 is threaded into the one side of a flange 68 of the nozzle 62 and its passage 69 communicates with a fuel passage 70 extending into a reservoir 71 of the nozzle.

When fuel is forced into the reservoir a valve 72 is lifted thereby from its seat 73, against the action of a spring 74 of the nozzle 62. The nose 76 forms, with a shoulder 77 of the casing 63, two auxiliary chambers 78 and 79 with a narrow passage 80 between them. The nose 81 of the casing 63 is provided with a central port 82 through which the jet of fuel passes from the orifice 75 into the cylinder 41. The nose 81 is also provided with angularly disposed, torch-forming ports 83 from which the torches of expanding gas issue into the cylinder 40. Canals 84 are provided in the casing 63 which perform the same function as the canals 51 of Figs. 1, 3 and 4. The casing 63 may also be provided with one or more check valves 43 to admit fresh air into the auxiliary chambers 78 and 79.

In order to assemble the nozzle 64 in the casing 63 the sleeve nut 85 is first slipped onto the nozzle, from the bottom end thereof. A split-ring metal gasket 86 is then inserted into the annular groove 87 in the nozzle 64, the nut 85 being close to the flange 80 while this is being done. The nozzle 64 may then be inserted into the shell 63 until a shoulder 88 thereon engages a cooperative shoulder or seat 89 of a ring 90 within the shell 63. Subsequently the sleeve nut 85 is threaded into the shell 63 to press the nozzle 61 against the seat 89 through the medium of the gasket 87, the ring 90 bearing against a seat 91 of the shell 63.

The type of check valve 43, used in the devices 19 and 62 of Figs. 1 and 2 respectively is illustrated in detail in Fig. 5, and includes a screw plug 92 threaded into the casing 20 or 63. The plug 92 has a port 93 which communicates with an aperture 94 in the casing 20 so that the air may pass through the aperture 94 and the port 93 into a chamber 95 containing a check element 96. The latter is provided on its hemispherical face with a groove 97 through which the air may pass when the check element 96 seats itself against the inner face of the chamber 95 during the intake stroke of the piston. The air passes from said groove 97 through a passage or port 98 to the auxiliary chamber 44. During the compression stroke and the power stroke of the piston the check element 96 of the valve 43, is forced against the inner end of the screw plug 92 to close the port 93 thus preventing escape of the gas from the chamber 44. The passages or ports 98 are arranged as in Fig. 8 to direct the jets of air substantially tangent to the nozzle thus producing a whirl in said chamber. This whirl is stimulated by the injection of the fuel into the chamber in the manner previously described. The result is a thorough mixing of the air and fuel in the auxiliary chambers.

From the foregoing it will be understood that this invention provides a new method and means of firing the power charge of an internal combustion engine in which oil is used as fuel, the method including the formation of three separate quantities of compressed air or combustion supporting fluid, namely a major quantity to form part of the power charge and two minor quantities to form parts auxiliary or ignition charges, introducing fuel into each of the quantities of compressed air and thereby ignite them, and utilizing the cumulative effect of the expanding gas produced by auxiliary charges to intensify the flame travel of the fire through the power charges and also intensify the turbulence therein.

Having thus described the invention it will be understood that variations may be resorted to without departing from the spirit of the invention defined in the appended claims.

I claim:

1. In an internal combustion engine having a cylinder, a firing chamber remote from the cylinder, and a firing chamber located intermediately between the cylinder and the remote firing chamber, the method of preparing a power charge in the cylinder, and preparing two firing charges one in each of the firing chambers to promote the combustion of the power charge, said method including the following, supplying air to the cylinder and supplying air to the firing chambers simultaneously but to the firing chambers independently of the air supply to the cylinder, utilizing the air while being introduced into the firing chambers to scavenge each one of them of products of combustion of a previously fired charge, compressing the air in the cylinder and the air in the firing chambers, introducing fuel oil into the compressed air in the cylinder and into the compressed air in the firing chambers in proportions to produce a leaner mixture in the intermediate firing chamber than in the cylinder and still a leaner mixture in the remote firing chamber than in the intermediate firing chamber, igniting the mixture in the cylinder and the firing chambers by compression, projecting the burning gas of the intermediate chamber into the cylinder, and utilizing the expanding gas of the remote firing chamber to act on the burning gas of the intermediate firing to thereby increase the fire travel of the gas projected from the intermediate firing chamber through the cylinder.

2. In an internal combustion engine having a cylinder, and a firing chamber, the method of preparing a power charge in the cylinder, and preparing a firing charge in the firing chamber to promote the combustion of the power charge, said method including the following, supplying air to the cylinder and to the firing chamber simultaneously but to the firing chamber independently of the cylinder, utilizing the air while being introduced into the firing chamber to scavenge the firing chamber of products of combustion of a previously fired charge, compressing the air in the cylinder and the air in the firing chamber, introducing fuel oil by a single supply into the compressed air in the cylinder and into the compressed air in the firing chambers in proportions to produce a leaner mixture in the firing chamber than in the cylinder, igniting the mixtures in the cylinder and the firing chamber by compression, and projecting the burning gas of the firing chamber into the cylinder to increase turbulence of the burning gas in the cylinder.

GEORGE K. STEWARD.